Sept. 24, 1963 C. S. DRAPER ETAL 3,104,545

GUIDANCE SYSTEM

Filed Aug. 8, 1952 9 Sheets-Sheet 1

INVENTORS
CHARLES S. DRAPER
WALTER WRIGLEY
ROGER B. WOODBURY
JOHN F. HUTZENLAUB

BY Kenway, Jenney, Witter + Hildreth

ATTORNEYS

GUIDANCE SYSTEM

Filed Aug. 8, 1952 9 Sheets-Sheet 2

INVENTORS
CHARLES S. DRAPER
WALTER WRIGLEY
ROGER B. WOODBURY
JOHN F. HUTZENLAUB

BY Kenway, Jenney, Witter + Hildreth

ATTORNEYS

INVENTORS

CHARLES S. DRAPER

WALTER WRIGLEY

ROGER B. WOODBURY

JOHN F. HUTZENLAUB

BY Kenway, Jenney, Witter & Hildreth

ATTORNEYS

INVENTORS
CHARLES S. DRAPER
WALTER WRIGLEY
ROGER B. WOODBURY
JOHN F. HUTZENLAUB
BY Kenway, Jenney, Witter & Hildreth
ATTORNEYS Sept. 24, 1963 C. S. DRAPER ETAL 3,104,545

GUIDANCE SYSTEM

Filed Aug. 8, 1952 9 Sheets-Sheet 5

INVENTORS
CHARLES S. DRAPER
WALTER WRIGLEY
ROGER B. WOODBURY
JOHN F. HUTZENLAUB
BY Kenway, Jenney, Witter + Hildreth
ATTORNEYS INVENTORS
CHARLES S. DRAPER
WALTER WRIGLEY
ROGER B. WOODBURY
JOHN F. HUTZENLAUB
BY Kenway, Jenney, Witter + Hildreth
ATTORNEYS

GUIDANCE SYSTEM

Filed Aug. 8, 1952 9 Sheets-Sheet 7

INVENTORS
CHARLES S. DRAPER
WALTER WRIGLEY
ROGER B. WOODBURY
JOHN F. HUTZENLAUB
BY Kenway, Jenney, Witter + Hildreth
ATTORNEYS INVENTORS
CHARLES S. DRAPER
WALTER WRIGLEY
ROGER B. WOODBURY
JOHN F. HUTZENLAUB
BY Kenway, Jenney, Witter & Hildreth
ATTORNEYS Sept. 24, 1963 C. S. DRAPER ETAL 3,104,545

GUIDANCE SYSTEM

Filed Aug. 8, 1952 9 Sheets-Sheet 9

INVENTORS
CHARLES S. DRAPER
WALTER WRIGLEY
ROGER B. WOODBURY
JOHN F. HUTZENLAUB
BY Kenway, Jenney, Witter & Hildreth
ATTORNEYS United States Patent Office 3,104,545

Patented Sept. 24, 1963

3,104,545

GUIDANCE SYSTEM

Charles S. Draper, Newton, Walter Wrigley, Quincy, Roger B. Woodbury, Waltham, and John F. Hutzenlaub, Belmont, Mass., assignors, by mesne assignments, to Massachusetts Institute of Technology, a corporation of Massachusetts Filed Aug. 8, 1952, Ser. No. 303,242
4 Claims. (Cl. 73—178)

Figure 1:
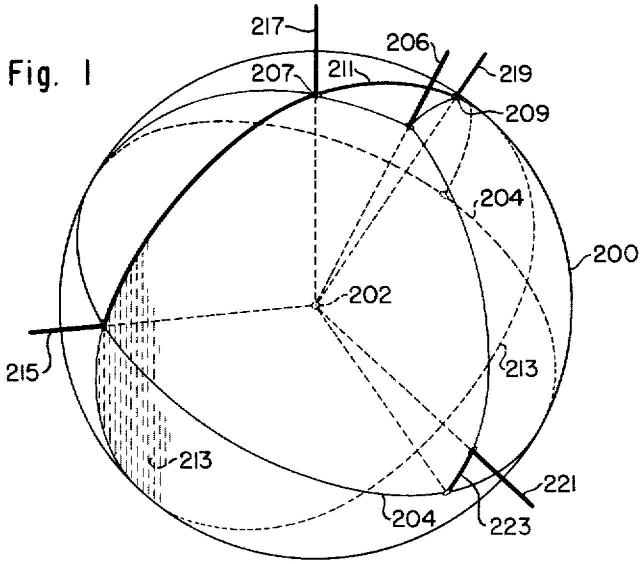

The present invention relates to gyroscopically controlled guidance systems and is more particularly concerned with apparatus for accurately defining a course over the earth's surface, continuously determining the position of a vehicle with respect to such a course and maintaining a desired position and direction of travel of the vehicle.

It has been found in work with gyroscopes that the single-degree-of-freedom gyro permits far greater accuracy than the conventional two-degree-of-freedom gyro. By using such gyros the conventional gimbal system for the gyro rotor is avoided with its concomitant difficulties of gimbal lock and gimbal friction. In its place is substituted a pair of axial bearings, and flotation and jeweled pivots may be used to reduce friction even more.

Further improvement can be made in gyroscope apparatus by using the gyro as a detector of deviations from the desired stable position instead of using the gyro as a self-stabilizing device. When the gyro is used as a detector, stabilization movements can be performed by any convenient means, such as servos, and need not be limited to the precession path of the gyro. Single-degree-of-freedom gyros are particularly well adapted for use as detectors in a gyro-servo stabilization loop. A detailed description of such a system will be found in the copending application of Draper, Woodbury and Hutzenlaub, Serial No. 216,946, filed March 22, 1951, now patent No. 2,752,793 dated July 3, 1956.

Further problems inherent in present-day navigational equipment arise from the need for a reference direction outside the vehicle. In the most familiar forms of automatic guidance systems, such an outer reference is provided by a man-made electromagnetic signal as in "beam" flying or in radar landing control systems. Such methods are subject to the objections that their range is small and that such signals are subject to interference from weather or from other man-made signals (the latter being an acute problem in military installations). Another technique is to use a star-tracking mechanism which automatically provides information about vehicle orientation in inertial space. Such an outside reference is subject to the vagaries of weather, and furthermore, over a long trip, several different stars may have to be used, requiring complicated and heavy equipment to effect a shift from one to another.

It is therefore one object of the present invention to provide a guidance system of greater accuracy than has hitherto been possible.

It is another object to provide a guidance system using only gyroscopes with a single degree of freedom.

It is another object of the present invention to provide a guidance system in which the gyroscopes are used as detecting devices and stabilization movements are performed by servos or other conventional means.

It is another object of the present invention to provide a guidance system that operates entirely without contacts or radiation reference outside the vehicle.

It is another object of the present invention to provide a gimbal reference system which, when added to any navigational device that includes a member stabilized in space will indicate a great circle course and the vehicle position therein.

In furtherance of the foregoing and other objects as will hereinafter appear, one of the principal features of the present invention is the use of gimbals as references. In most gyroscopic navigational systems, the gyroscope itself or a member attached thereto is the one which is held fixed in space and used as a reference from which positional information is taken. In the present invention, however, extra gimbals are provided in addition to the isolation gimbals. (Or, in certain embodiments, particular gimbals do double duty, both as references and isolators.) Then, for example, an earth reference can be acquired from a gyro member which is stabilized in inertial space by using one of the extra gimbals and driving it around the controlled member by a sidereal time drive. Similarly the other reference gimbals will indicate the programmed course or track plane and the aircraft position in it.

A further feature of this invention is the conversion of all data into the single dimension of essentially geocentric angles. The gimbal reference system establishes what is, in effect, a tiny model of the earth which follows it in motion. All information such as the vertical at a given position, destination vertical, departure vertical or the programmed course is converted by this "model" into navigational information in terms of geocentric angles, which may, if desired, be used to give longitude and latitude or astronomical position, directly.

Another feature of the present invention is the use of the intergrating gyro, one type of single-degree-of-freedom gyro. A single-degree-of-freedom gyro is one that can be deflected about one axis only, the output axis, perpendicular to the spin axis. What distinguishes the integrating gyro from other single-degree-of-freedom gyroscopes is that damping is provided about the output axis and no other restraint is provided so that a viscous damping torque is the only torque resisting deflections about the output axis. It can be shown mathematically that this damping causes the output deflection to be proportional to the input deflection instead of to the rate of change of input deflection.

A further feature of the invention lies in the use of servo means in conjunction with integrating gyros to stabilize a controlled member in inertial space, forming an electromechanical feedback loop which holds the controlled member in a neutral position established by the three null positions of the gyros. A more detailed description of this feature will be found in the above-mentioned Patent No. 2,752,793.

The present invention adds to the features of the stabilization system there described by combining with it the above-mentioned extra gimbals and detectors which provide references for a programmed great circle course. However, the present invention is not limited to the system there described; the gimbals and detectors can be added to any system in which there is a member stabilized to inertial space. The extra gimbals, called here the reference system, provide physical axes which, by their position, continuously indicate a programmed course and the vehicle's position in it while the detectors show any deviations from the course. By virtue of the high degree of accuracy obtainable from single-degree-of-freedom gyros, the aircraft in the preferred embodiment can be guided with long-time errors of the order of one or two minutes of arc corresponding to an error of a few miles in ten or twelve hours of operation.

Figure 2:
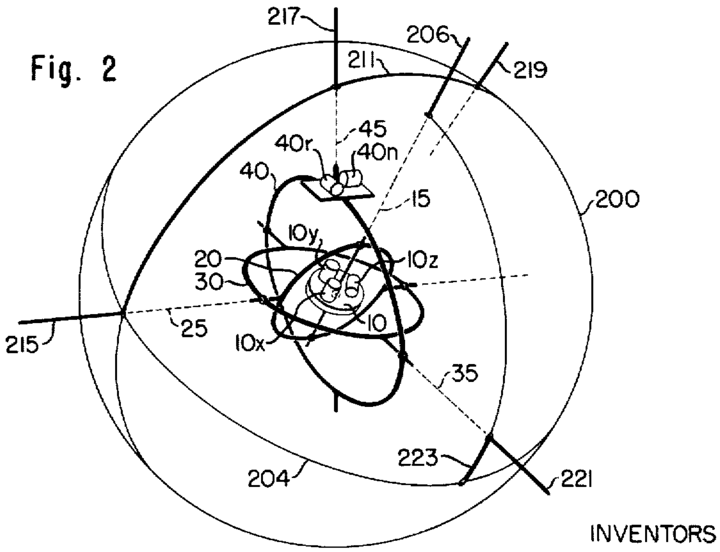
Figure 3:
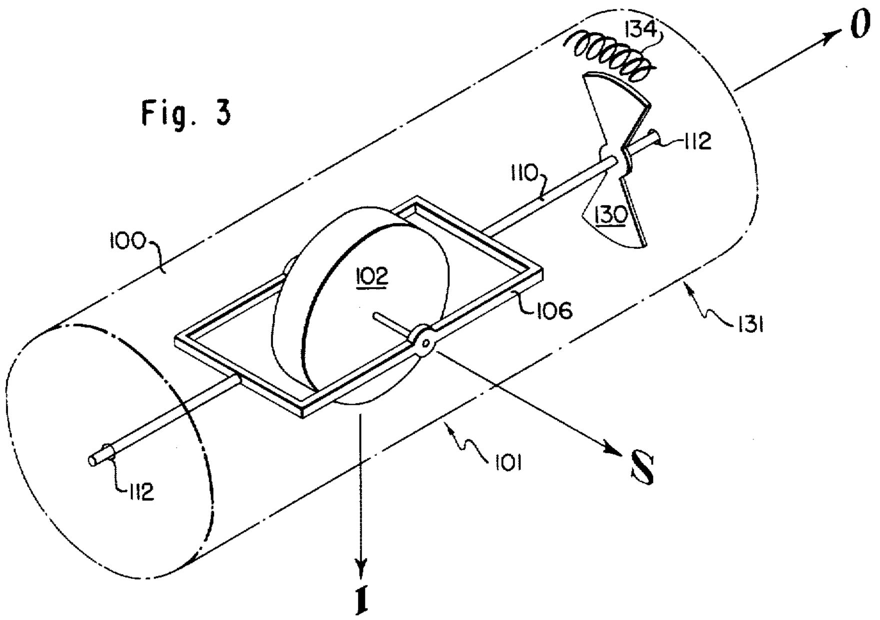
Figure 5:
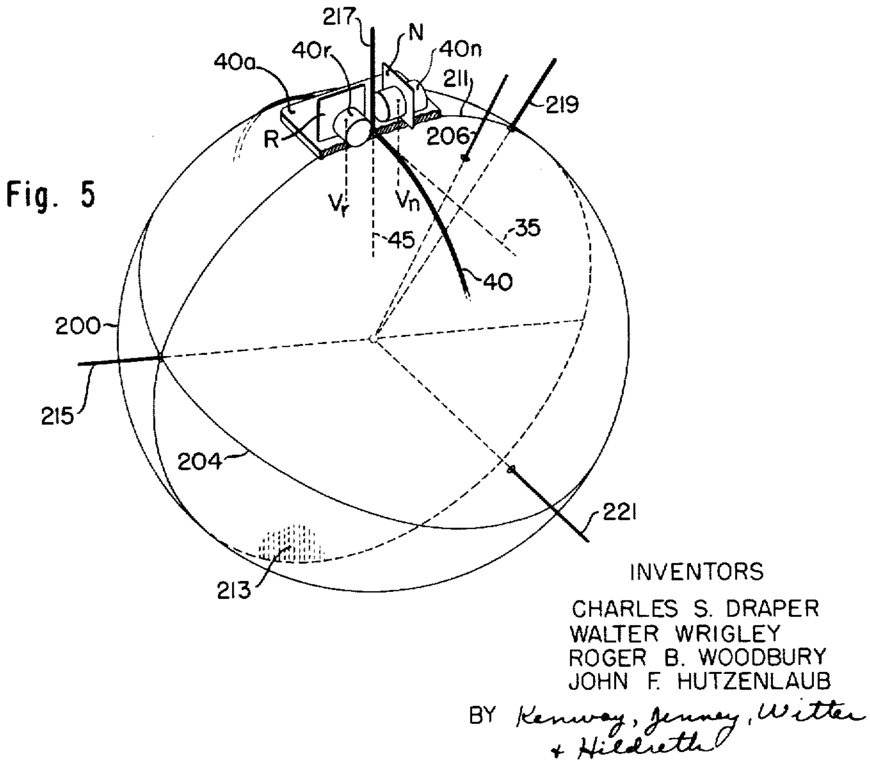
Figure 4:
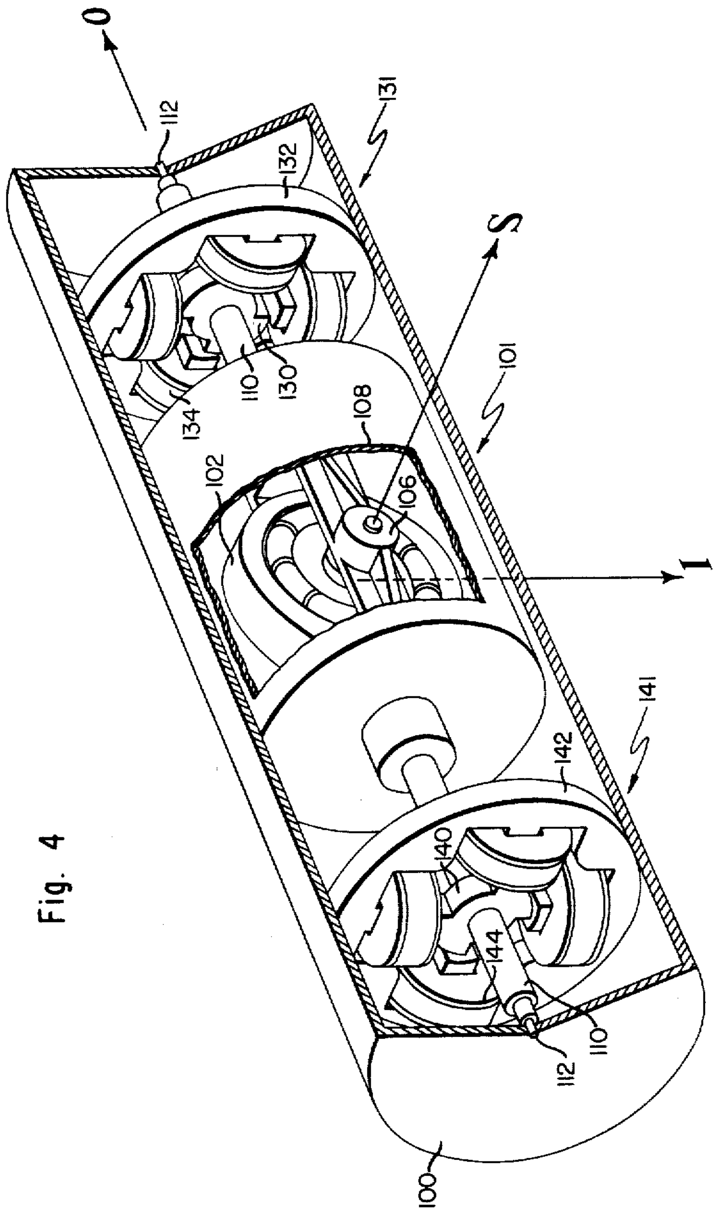
Figure 6:
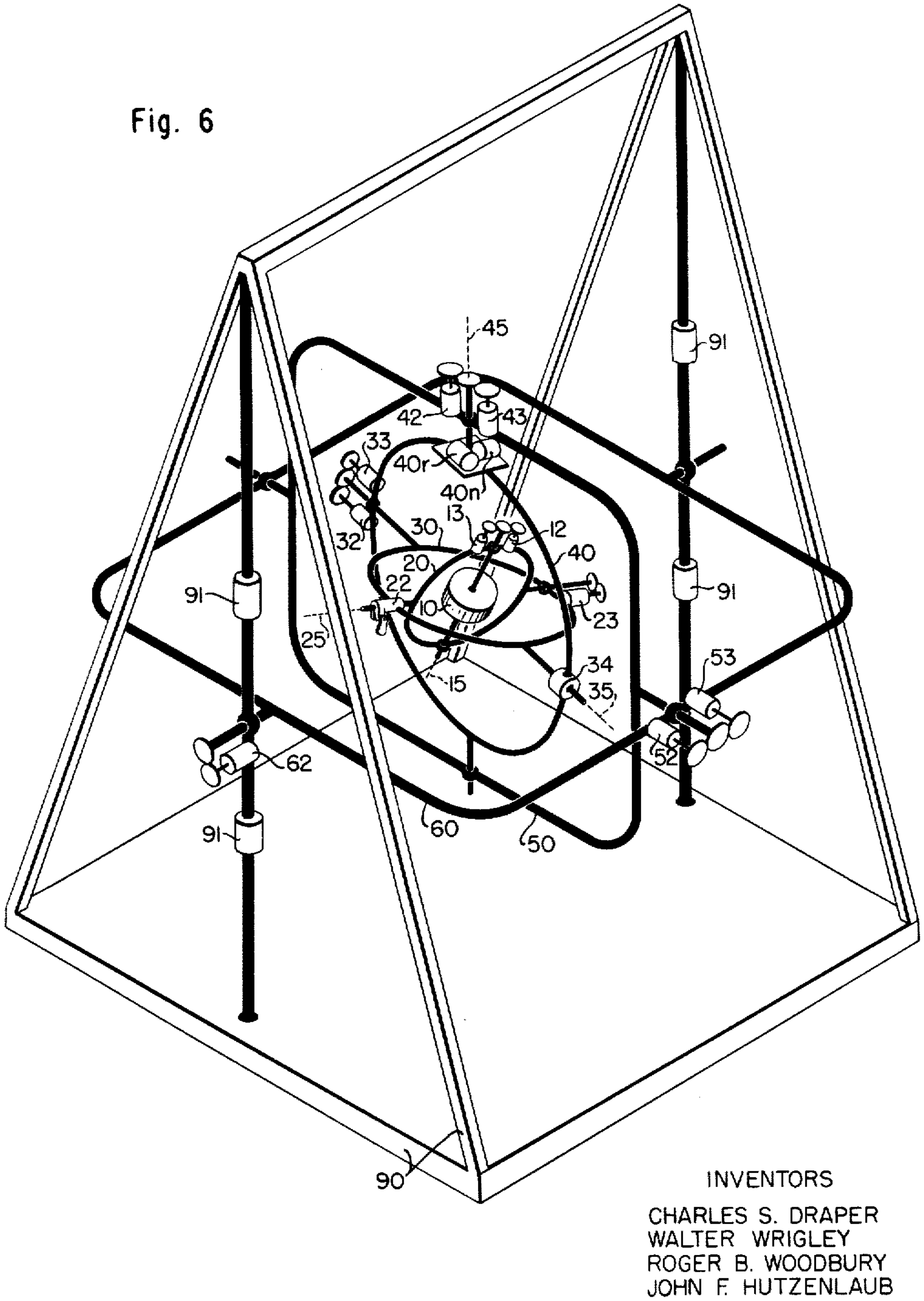
Figure 7:
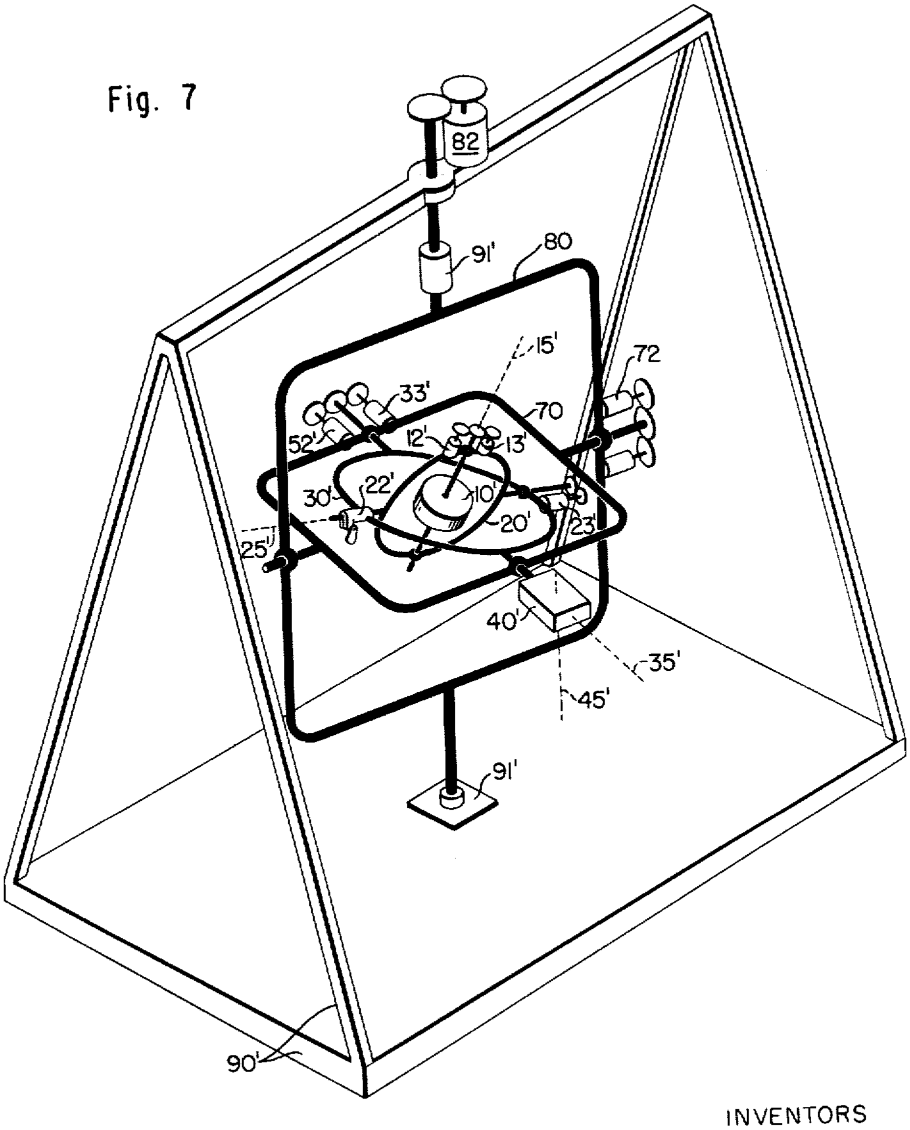
Figures 8, 9:
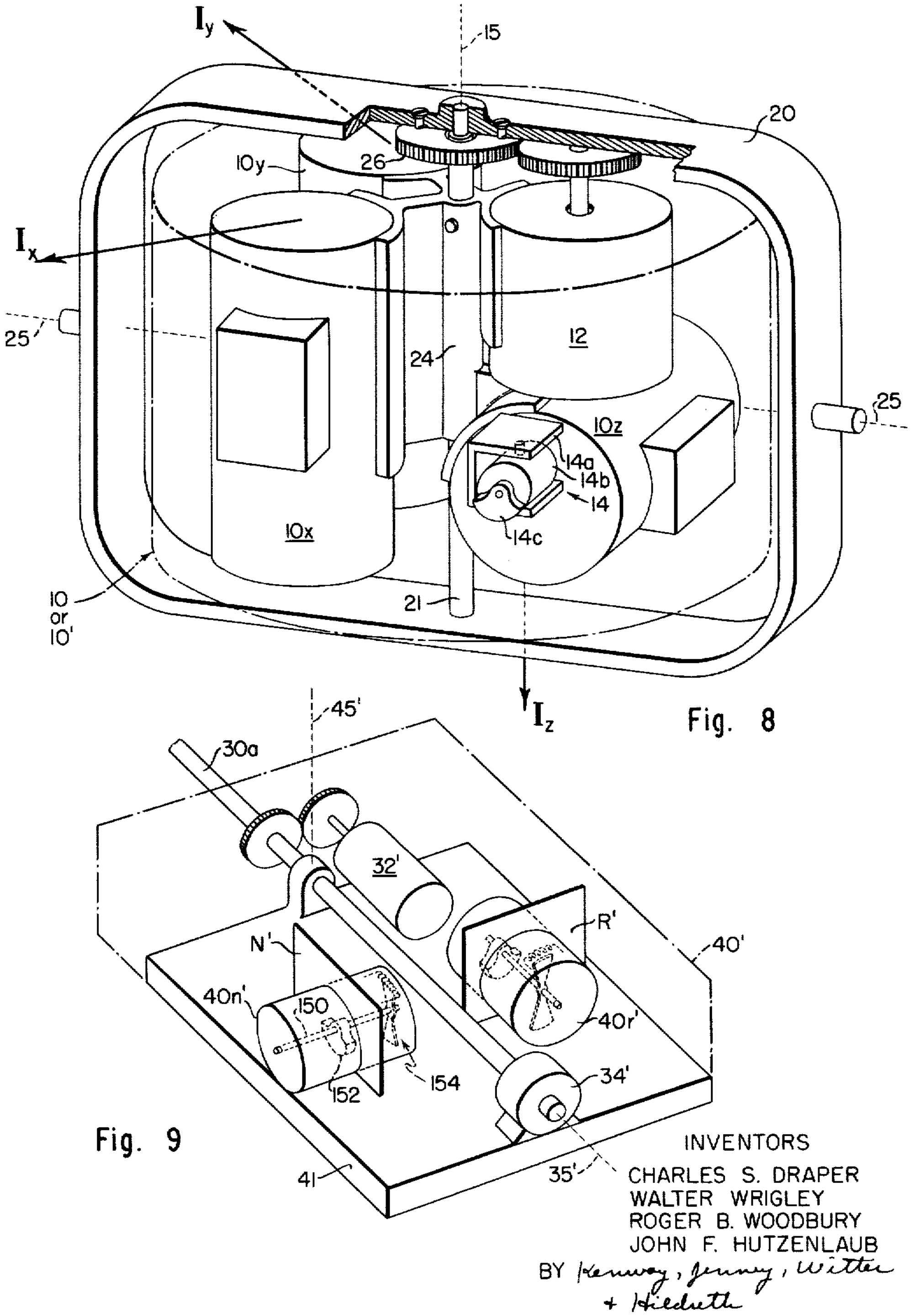
Figures 10, 11:
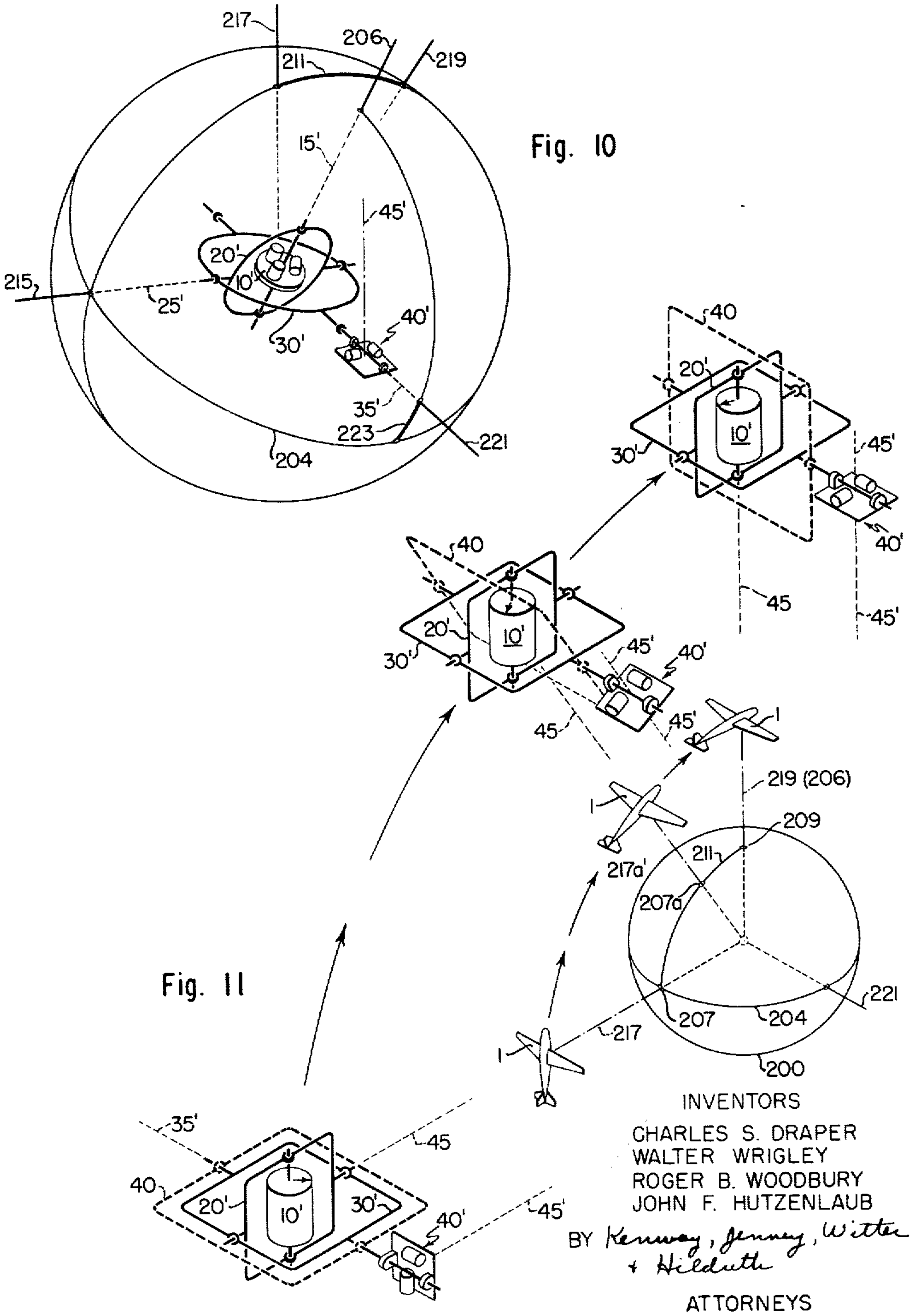
Figure 12:
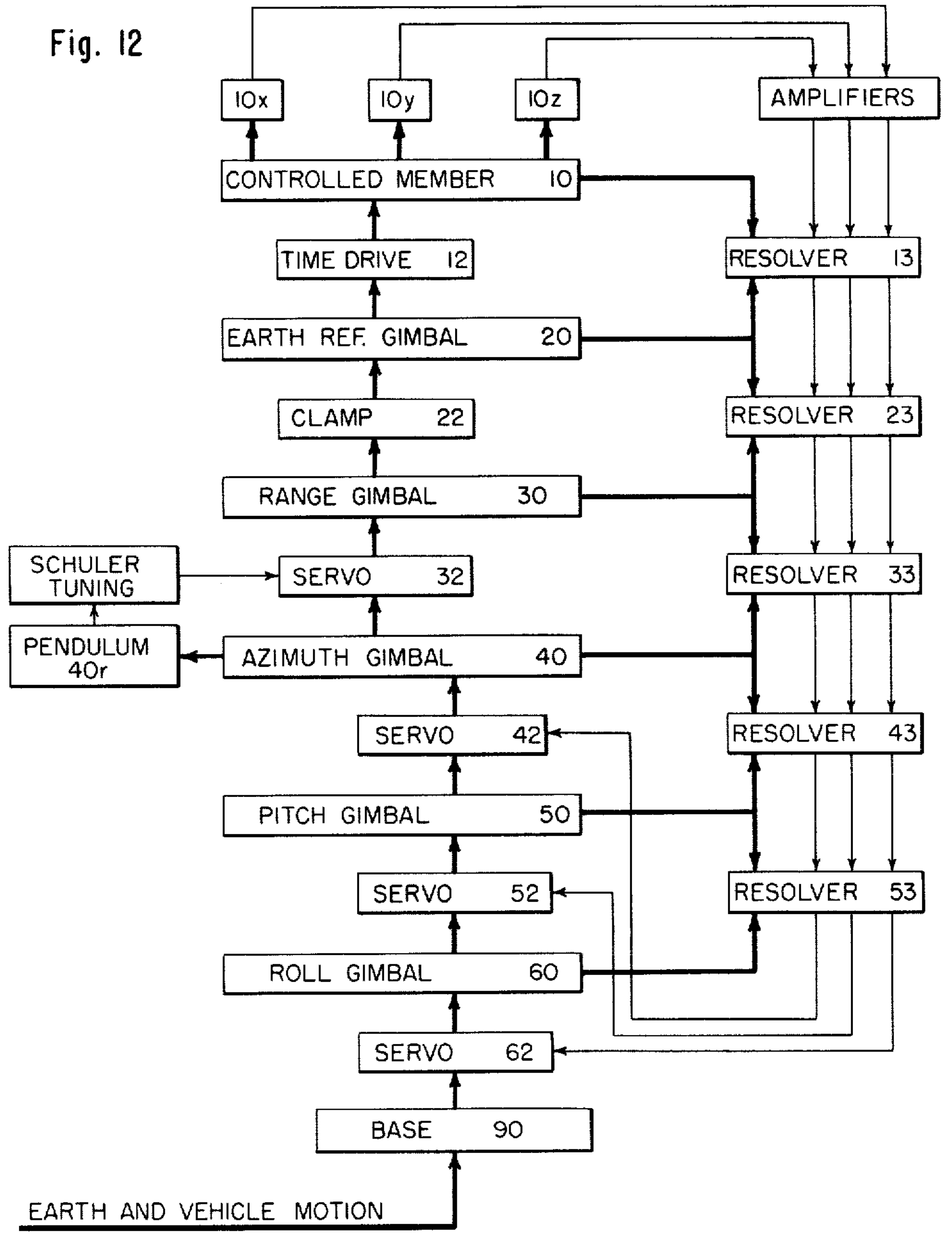
Figure 13:
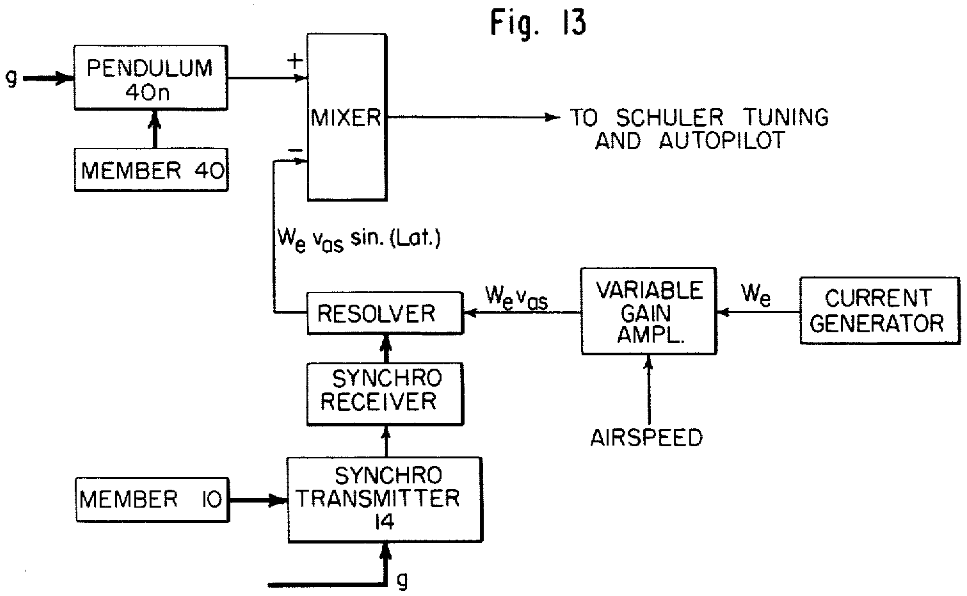

In the accompanying drawings which show two preferred embodiments of the present invention, FIG. 1 is an illustrative drawing of the earth showing the critical points and directions on the earth; FIG. 2 is an illustrative diagram showing how the reference gimbals indicate those points and directions; FIGS. 3 and 4 are schematic drawings of the preferred gyroscope unit used in the invention; FIG. 5 is an illustrative drawing showing how the vertical is used to solve part of the guidance problem; FIG. 6 is a schematic drawing of a five-gimbal embodiment of the present invention; FIG. 7 is a schematic drawing of a four-gimbal embodiment of the present invention; FIG. 8 is a pictorial view of an inner member suitable for use in either the four or five-gimbal embodiment; FIG. 9 is a pictorial view of a vertical-indicating member suitable for use in the four-gimbal embodiment; FIG. 10 is an illustrative drawing like FIG. 2 showing how the four-gimbal configuration indicates the necessary points on the earth's surface; FIG. 11 is an illustrative drawing showing how the present invention (in either the four-gimbal or five-gimbal form) operates on a trip over the earth's surface; FIGS. 12 and 13 are block diagrams showing certain of the electrical and mechanical interconnections of the components.

The present invention will be described in the following manner. First, the guidance problem will be outlined generally and the method of solution taught by the present invention will be described. Second, it will be shown how a reference to fixed space is maintained by describing the integrating gyroscope and the gyro-servo loops used in the present invention. Third, it will be shown how the vertical is detected and how the vertical so detected is used to indicate the distance from destination (Range Indication) and to keep the vehicle on course (Track Control). Fourth, the overall configuration will be explained in two embodiments, the five-gimbal system (FIG. 6) and the four-gimbal system (FIG. 7). Finally, the overall operation will be explained by means of a hypothetical trip from the equator to the pole, and it will be shown how corrections for Coriolis effects may be introduced.

*The Guidance Problem*

The so-called guidance problem is to navigate a vehicle from a home or departure point to a destination or arrival point by non-human means. It can be assumed that all the necessary navigational information is known at the home point, and that the astronomical position of the destination is known. Furthermore, in view of the existence of automatic piloting apparatus, the problem is really to indicate arrival at destination and, during travel, to provide the necessary information to an autopilot to keep the vehicle on course. Therefore, the problem consists of (*a*) how far the vehicle has yet to go to reach the arrival point and (*b*) whether the vehicle has deviated from the course which will take it to the arrival point, and in the latter case the autopilot must return the vehicle to its course. The first problem is called the range problem and the second, the track control problem. For both problems, a guidance system must "remember" the course the vehicle is supposed to take and must be able to determine the position of the vehicle with respect to that course.

In FIG. 1, is shown a sphere 200 representing the earth, with its center at 202, the equator at 204 and the polar axis at 206. The departure point is shown at 207 and the destination point at 209. The range-to-go is measured along a great circle between these two points; this great circle is denoted 211 and its plane 213. The verticals at the departure and destination points are shown at 217 and 219 respectively; both these lines lie in the plane 213. The great circle plane 213 intersects the equatorial plane 204 in a line, here termed the equatorial line 215. The normal to the great circle plane 213 is shown at 221; its latitude, i.e. great circle distance from the equator, is shown at 223.

The method used in the present invention to solve the range problem is to determine continuously the vertical at the vehicle position. Then, the range-to-go is the geocentric angle between the vehicle vertical and the destination vertical 219.

The method used in the present invention to solve the track control problem is to determine what the vehicle vertical would be if the vehicle were on course and to determine any incipient angular difference between the actual vehicle vertical and the on-course vertical represented by cross-course accelerations. This quantity is used to activate the autopilot to keep the vehicle on its course.

Since both the destination vertical 219 and the vertical at one or more points along the course are remembered, this is the equivalent of remembering the programmed great circle 211, since the programmed verticals define the great circle plane 213.

The apparatus described below for solving the guidance problem has been designed particularly for aircraft, but it will be apparent to one skilled in the art that with minor changes, the same apparatus may be used in ships or submarines.

*The Gimbal Solution*

In FIG. 2 is shown the basic gimbal configuration by which the various directions of the guidance problem are represented. A controlled or stabilized member 10 is shown (represented as a table), surrounded by three gimbals 20, 30 and 40. It will be assumed here that the controlled member 10 is held fixed in space. The means for this (which include the three gyroscopes mounted on the member 10) will be described below. The axis 15 of the controlled member 10 and gimbal 20 is held fixed in space, parallel to the polar axis of the earth 206. The gimbal 20 immediately surrounding the controlled member 10 is denoted the earth reference gimbal and it is rotatable about the axis 15. A sidereal time drive is provided for rotating this gimbal about the controlled member at the same rate that the earth rotates with respect to fixed space. In this way, since it rotates about the polar axis at the earth's rate, the earth reference gimbal becomes a miniature earth, rotating with respect to space about the same axis and at the same speed.

The axis 15 (linking the member 10 and gimbal 20) is parallel to the polar axis of the earth; the axis 25 (linking the gimbals 20 and 30) is parallel to the equator plane, because it is perpendicular to axis 15. As can be seen from FIG. 2, this axis is made parallel to the equatorial line 215. The gimbal next out from the earth reference gimbal 20 is the range gimbal 30, rotatable when clamp 22 is loosened about the axis 25 which is parallel to the equatorial line 215. The axis 35 about which the next gimbal 40 rotates is made the axis 221, which is the polar axis of or the normal to the programmed great circle. This axis defines the vehicle course and may be termed the program axis because it is normal to the great circle plane 213 and the great circle 211. The angle between the range gimbal 30 and the earth reference gimbal 20 (that is, the angle between the axes 15 and 35) is set at the colatitude of the great circle's polar axis 221, and if the range axis 25 is then set parallel to the equatorial line 215, the great circle 211 is defined. These settings can be made at the departure point.

The azimuth gimbal 40 rotates about the axis 35. This gimbal has an axis 45 always perpendicular to the axis 35, and the axis 45 sweeps out the great circle plane 213 programmed for the vehicle. This axis is stabilized to the vertical at the vehicle's position by means of pendulum units mounted on the gimbal 40 (shown as **40*r* and 40*n* in FIG. 2, and to be described in detail later). As will be explained in more detail below, one pendulum unit detects the direction of gravity plus horizontal acceleration in the great circle plane 213 and the other detects that direction in a plane perpendicular to the plane 213. The first unit is the range indicating unit and it is used to line up the azimuth gimbal 40 so that the axis 45 indicates the vehicle vertical. The angle between axis 45 and the destination vertical 219 is then the range-to-go. (The angle between the destination vertical 219 and the equatorial line 215 is known; the angle between axis 45 and axis 25 (parallel to 215**) may be measured; the difference between these two angles is the range-to-go.)

The second or track control pendulum unit detects the direction of resultant acceleration in the cross-course plane N containing the axis 45 and which is normal to the great circle plane 213. From this quantity is generated a signal representing the vehicle's cross-course velocity and that signal is used to activate the autopilot to bring the vehicle back on course.

The gimbal configuration of FIG. 2 supplies the necessary guidance information provided that (1) the azimuth gimbal is fixed to the vertical at the vehicle position, (2) the controlled member 10 in the center is held fixed in space, with the axis 15 parallel to the earth's axis.

Shown mounted on the azimuth gimbal are two cylindrical cases containing pendulums from which the information for determining the vertical is obtained. Similar cases for gyroscopes are shown on the controlled member 10, containing the single-degree-of-freedom gyroscopes used to keep the controlled member 10 fixed in intertial space.

*The Integrating Gyroscope*

FIGS. 3 and 4 show schematically a preferred form of single-degree-of-freedom gyroscope. The gyroscope is preferably of the type described in the copending application, Serial No. 210,246 of Jarosh, Haskell and Dunnell, filed February 9, 1951, now Patent No. 2,752,791, and we wish it understood that the present brief description is to be supplemented by the expanded description in that specification. The assembly is mounted in a case 100 by means of the axial bearings 112. The gyro rotor 102 is mounted, free to spin, in the frame 106 which is attached to the shaft 110 which rotates in the bearings 112. Also mounted on the shaft 110 is a chamber 108 (FIG. 4) containing the gyro rotor and frame. The chamber is shaped so that there is only a small clearance between it and the case. The case is filled with a viscous fluid (not shown) to resist rotations of the chamber and thus to damp deflections of the frame 106 and rotor 102 with respect to the case. Furthermore, the shaft 110 carries a signal generator and torque generator. The signal generator 131 is shown as a rotor 130, with stator 132 and stator windings 134 rigidly attached to the case; the torque generator 141 is not used in the present invention and is therefore not described. Both units are preferably of the type described in the U.S. Patent No. 2,488,734 of Mueller, issued Nov. 22, 1949. When a reference voltage is applied to the signal generator windings 134, the device produces an output voltage proportional to the deflection of the rotor 130 (and shaft 110) from a neutral position with respect to the stator 132 (and case 100).

The operation of the single-degree-of-freedom gyroscope will now be explained with particular reference to FIG. 3. The gyro rotor 102 spins about the spin axis S. The rotor will exert reaction torques against its frame 106, but, since the frame is rotatable only in the axis of the bearings 112, the only gyro reaction torque which causes rotation of the gyro element 101 relative to the case 100 is a torque about the output axis O. It is well-known that the reaction torque of a gyro is perpendicular to the spin axis and the axis about which the gyro is rotated. Therefore, since the reaction torque of the gyro to cause output rotation is about the axis O, only motion about the input axis I (perpendicular to the spin axis S and output axis O) causes output rotation. This deflection is picked up by the signal generator 131 and converted to an electrical output. Thus, the gyro unit operates in such a way that motion of the case 100 about the input axis I produces an electric output from the signal generator 131.

The purpose and operation of the damping will now be explained with particular reference to FIG. 4. If the case 100 is rotated about the input axis I through an angle $\alpha$, a reaction torque is generated tending to rotate the gyro rotor 102 about its output axis O. The magnitude of this torque is $$H\frac{d\alpha}{dt}$$

where H is the angular momentum of the gyro rotor, and $$\frac{d\alpha}{dt}$$

the angular velocity of motion about the axis I. This output torque is opposed by the damping torque which is $$C\frac{d\theta}{dt}$$

where C is the damping coefficient, $\theta$, the angle through which the shaft 110 moves and $$\frac{d\theta}{dt}$$

the angular velocity of the frame 106 and rotor 102 about the axis O. At equilibrium, these torques balance. (The damping is made large enough so that the inertia about the output axis may be neglected.)

$$H\frac{d\alpha}{dt}=C\frac{d\theta}{dt} \tag{1}$$

The angle $\theta$ can be expressed:

$$\theta=\frac{H}{C}\int\left(\frac{d\alpha}{dt}\right)dt=\frac{H}{C}\alpha \tag{2}$$

$\theta$, the output deflection of the gyro, is proportional to the time-integral of the angular velocity or rate about the input axis (which is why this type of gyro is referred to as a "rate-integrating gyro"); $\theta$ and the output of the signal generator 131 are therefore proportional to $\alpha$. The output of the gyro unit is proportional to its angular deflection about the input axis I. A more detailed description of the gyro-servo loops used in the present invention will be found in the above mentioned Patent No. 2,752,793, and we wish it understood that the present brief description is to be supplemented by reference to that specification.

These integrating gyros are used in the present invention as detectors of motion which activate servos to nullify the detected motion in closed gyro-servo loops. If a servomotor is provided to rotate the gyro case 100, with the axis of motion colinear with the gyro input axis I, and if, in a stable loop, the gyro output is used to activate the servo, then, when the gyro detected motion of its case about the input axis I, the servo would move the case until there was no output signal, i.e., no net displacement about the axis I. If the servo axis were at some angle to the axis I, by multiplying the gyro output by the appropriate trigonometric function of that angle, the gyro output could be made proportional to the deflection about the servo axis and the loop set up that way. Thus, the gyro case or a member attached to it can be held fixed in space, by using three such loops to form from the input axes of the gyros three orthogonal axes about which stabilization is made.

More specifically, the three integrating gyros are mounted on the member 10 as shown in FIGS. 2, 8 and 10. These gyros detect rotational motion of the member 10 in space, that is, they detect any deviation of the axis 15 (FIGS. 2 and 10) from its fix parallel to the polar axis 206. Servos are provided, as described below, which move isolation gimbals exterior to the configuration shown in FIGS. 2 or 8, thereby moving the reference gimbal configuration as a whole. The gyro outputs, proportional to the angle of deviation, are used to activate the servos. However, the gyro outputs are modified by being passed through resolvers so that the outputs are converted from deviations about the gyro axes to deviations about the servo axes.

A resolver consists of relatively rotatable coils, the input being fed to one coil and the output or outputs taken from a coil or coils movable relative thereto. The output is the input multiplied by a trigonometric function of the rotor-stator angle. By mounting the resolver with its stator connected to one gimbal and its rotor to an inner gimbal and using the gyro output as the stator input, the gyro outputs are suitably multiplied by the trigonometric functions of the angles between the successive gimbals. Thus, each gyro signal output is allocated in magnitude and direction to the appropriate servos in such a way that the signal is most directly reduced to zero. It should be understood that over-correction by any servo would be followed by an error signal from one or more gyros so that the system is always positioned to produce zero output from the gyro. The location of the resolvers and servos is discussed below and the resolution process is explained in detail in the above-mentioned copending application.

*Determination of the Vertical*

FIG. 5 shows the relation of the pendulum detectors to the guidance problem. Two pendulum units **40*n* and 40*r* are mounted on the gimbal 40. These are shown also in FIGS. 2 and 6, and for convenience in showing the various directions they are indicated as if mounted on a platform 40*a* carried by the gimbal. The platform 40*a*, being fixed to the gimbal 40, is thus coupled to the range gimbal 30 for rotation about its program axis 35**.

The pendulum units **40*n* and 40*r* are preferably of the single-degree-of-freedom type, as shown in somewhat more detail in FIG. 9. As such, they contain a shaft such as 150 (see unit 40*n* in FIG. 9) mounted on axial bearings in the cylindrical case. Attached to the shaft 150 is a pendulous mass 152 which, as it swings, rotates the shaft. Also mounted about the shaft 150 is a signal generator 154 like that shown at 131 in FIGS. 3 and 4, and constructed like the signal generator in FIG. 4, with a stator connected to the case and stator windings mounted on the stator and with a rotor attached to the shaft 150 so that the signal generator output is a measure of the pendulum deflection from a zero point. This zero point is so arranged that the output is zero when the member 40*a*** is horizontal and the pendulous mass is hanging straight down. These pendulum units are preferably exactly the same as those described in the copending application Serial No. 222,792, of Jarosh and Picardi, filed April 25, 1951, now Patent No. 2,802,956, dated Aug. 13, 1957, and applicants wish it understood that the above brief description is to be supplemented by a reference to that specification.

As shown in FIG. 5, each single-degree-of-freedom pendulum is sensitive to accelerations in one plane only, the plane perpendicular to its shaft. The two pendulum units of FIG. 5 are arranged so that the pendulum unit **40*r* detects accelerations in the plane R, which is the range plane parallel to the great circle course 211, and so that the pendulum unit 40*n* detects accelerations in the cross-course plane N, normal to the great circle course 211**.

It will be assumed for the present that the pendulous masses hang to true vertical. That is, that the pendulous mass in the unit **40*r* hangs along $V_r$, the true vertical in the R plane and the mass in the unit 40*n* hangs along $V_n$, the true vertical in the N plane. (Linear accelerations of the member 40*a*** will deflect the pendulums; the effect of such accelerations will be discussed below.)

The range unit **40*r* activates a servo to move the member 40*a* (as shown at 32 in FIG. 6 and as will be described below). The member 40*a* is not affected directly by the unit 40*n* at all. The normal to the member 40*a* is designated 45 (compare FIG. 2) and when the axis 45 is parallel to true vertical in the R plane, $V_r$, the output from the unit 40*r* is zero. If the member 40*a* is rotated away from this position about the axis 35 (which is parallel to the normal 221 to the great circle as shown in FIGS. 5 and 2), the output of the unit 40*r* is not zero, and the servo 32 is activated to bring the member 40*a* back to its horizontal position, when the output is again nulled. Thus, the axis 45 is maintained parallel to $V_r$, true vertical in the R plane. It can be seen from FIGS. 2 and 5 that, when this is so, the angle between the axis 45 and the arrival point vertical 219 is the geocentric angle of range-to-go. Therefore, as the vehicle carries the member 40*a* from the departure point (where the member is shown in FIG. 5) to the destination point, the member 40*a* is continuously aligned so the axis 45 indicates $V_r$ and the angle between axis 45 and vertical 219 (measured from a reference line such as the equatorial line 215 represented by axis 25** in FIG. 2) is the range-to-go. This is how the range indication problem is solved by vertical indication.

The track control problem is somewhat more complicated. Assuming no accelerations in plane N, the output of the unit **40*n* is zero when the vehicle with member 40*a* is on its course 211. It can be seen by a comparison of FIGS. 2 and 5 that the member 40*a* is free to rotate only about the axis 35, and therefore the direction of the axis 45 (the normal to the platform 40*a*) in the N plane is fixed. Axis 45 is always perpendicular to axis 35; axis 35 is perpendicular to the plane 213; therefore axis 45 is always parallel to the plane 213. The direction of $V_n$, true vertical in the N plane, depends on the position on the earth of the member 40*a*. If the member is on its course 211, $V_n$ is parallel to the great circle plane 213, and parallel to the axis 45**, so the pendulum output is zero.

If, however, the member **40*a* goes off its course, $V_n$, being directed toward the center of the earth, is no longer parallel to axis 45. The angle between $V_n$ and axis 45 is the geocentric angle by which the member is off course. In other words, axis 45 is always parallel to the on-course $V_n$ and the angle between $V_n$ on-course and $V_n$ off-course is the angular distance the member 40*a*** has moved off its course.

This error output is used to activate the autopilot to bring the member **40*a* on course. (A suitable autopilot is described in the copending application of Seamans et al., Serial No. 245,188, filed September 5, 1951, now Patent No. 2,868,481, dated January 13, 1959. The autopilot, as such, forms no part of the present invention.) When $V_n$ and axis 45 are again parallel, the output of the unit 40*n* is nulled and the autopilot no longer acts across course. It is to be understood that the track control system responds continuously to cross-course winds, that as soon as any error is sensed by the unit 40*n***, the autopilot is activated to counteract the cross-wind effects.

It remains to be shown how the indications of $V_n$ and $V_r$ are made substantially free of errors due to linear accelerations of the member **40*a***. The situations of range indicating and track control will be treated separately.

In the range control system, the unit **40*r* activates a servo which rotates the member 40*a*, thereby forming a closed loop. Linear accelerations of the member 40*a* cause the pendulum to hang away from true vertical $V_r$. In order to achieve Schuler tuning characteristics so as to indicate true vertical, the pendulum unit output is integrated twice, the first time by a suitable integrator acting on the electric output, the second time by the velocity-drive servo which moves the member 40*a*, producing an angular position of the member which is the time-integral of the servo input which is taken from the integrator output. In this way, the angular position of the member 40*a* about the axis 35 is the double time-integral of the angular deflection of the pendulous mass in the unit 40*r***.

This angular deflection has, in general, two components, a long-period deflection due to motion of the member **40*a*** from the departure point to the destination point and a short-period deflection caused by the linear acceleration. The effect of the integrations may be considered simply as a smoothing of the pendulum unit output signal, averaging out the short period deflections.

A more accurate way of considering the operation is to recognize that the member 40a acts as an equivalent Schuler pendulum. That is, the double integration gives the circuit an oscillatory mode, so that the member 40a will swing in response to a deflection of the pendulous mass in the unit 40r. The member is an equivalent pendulum because it will respond to an acceleration by oscillating back and forth around a neutral position where the axis 45 is parallel to $V_r$.

It has been shown that a "Schuler pendulum" will hang to true vertical regardless of linear accelerations of its support. A Schuler pendulum is one with a period of 84.6 minutes and as such is a physical impracticability. However, an equivalent pendulum is made which includes the member 40a and the pendulum 40r, by doubly integrating the pendulum unit output, and the equivalent pendulum so made can be given an 84.6 minute period by simply adjusting the sensitivities of the integrator and servo drive. By making the equivalent pendulum a Schuler pendulum, that is, by giving it an 84-minute period, the member 40a is always horizontal and the axis 45 indicates $V_r$, regardless of horizontal accelerations. Furthermore, the addition of damping greatly decreases the inaccuracies due to imperfect components or inaccurate alignment.

The method of and means for indicating $V_r$ in the present invention are preferably exactly the same as those disclosed in the copending application of Wrigley and Draper, Serial No. 249,182, filed September 21, 1951, now abandoned, and we wish it understood that the simplified explanation above is to be supplemented by a reference to that specification.

The track control system is more complicated because the correction process itself (that is, returning the member 40a to the course 211) introduces accelerations in the N plane. However, the Schuler tuning principle is also used for track control. By using the pendulum 40n to detect cross-course accelerations and to activate the autopilot, a Schuler-tuned track control loop is set up. The output of the unit 40n is preferably damped and the output is used to activate an autopilot which moves the aircraft or other vehicle back to the course 211 at a velocity proportional to its input. The system comprising the unit 40n, the autopilot and the aircraft is made to form a damped equivalent pendulum with an 84-minute period with the airplane corresponding to the pendulum bob.

The method and means for maintaining the vehicle on course in the present invention are preferably exactly the same as those disclosed in the copending application of Woodbury, Hutzenlaub and Atwood, Serial No. 304,386, filed August 14, 1952, and we wish it understood that the simplified explanation above is to be supplemented by a reference to that sepcification.

In both the range indication and track control systems, damping is introduced to reduce inherent errors in the equivalent Schuler pendulum system, as described in the two above-mentioned copending applications. (Damping is always present in the track control system and cannot practically be removed if desired.) The damping introduced is of a specified type to hold forced dynamic errors to a minimum.

To summarize, FIG. 5 shows the relation of the pendulum detectors to the guidance problem. The pendulums are single-degree-of-freedom pendulums; that is, the pendulum mass is constrained to swing in only one plane, by attaching the mass to a shaft in bearings. The pendulum then deflects to indicate the direction of resultant acceleration in one plane. These planes are indicated in FIG. 5 at R and N. Signal generators in the pendulum units generate an electric signal proportional to the pendulum deflection.

The pendulums are mounted on a member 40a, which is to be maintained horizontal; the axis 45 (normal to the member 40a), if held to the vertical, sweeps out the great circle course 211 as the vehicle moves along it. The pendulums are so mounted on the gimbal that one input plane R is parallel to the programmed course and one input plane N is normal to it.

The parallel input plane R, called the range indication plane, contains the vehicle vertical $V_r$ and the destination vertical 219, "remembered" by the gimbal system as a specified angle between the azimuth gimbal 40 and the range gimbal 30. The angle between the vertical indicated in this plane, $V_r$, and the destination vertical 219 is the range-to-go.

The input plane N normal to the course is the track control plane. The geocentric angle by which the vehicle is off course is the angle between the true vertical in that plane, $V_n$, and the axis 45 or programmed vertical. This angle is used as an error angle the signal proportional to which activates an autopilot to null the pendulum deflection, thereby keeping the vehicle on course.

However, vehicle accelerations will cause the range-indicating pendulum 40r to hang, not to true vertical but parallel to the line of resultant force on its bob. In order to obtain from the range pendulum an indication of true vertical it is necessary to integrate the signal output of the pendulum unit twice, with specified sensitivities and damping in the system. The result is the angular position of a member 40a which is the double time-integral of the angular deflection of the pendulum. The double-integration introduces Schuler tuning, enabling the member 40a to indicate the true vertical.

In the case of track control, using the output of the pendulum unit 40n to activate an autopilot with a very large negative response, produces a Schuler-tuned system. Damping (in the form of integrators with feedback) is provided to smooth the overall response.

*The Five-Gimbal Guidance System*

FIG. 6 is a schematic drawing of one system according to the present invention. It is a system embodying five gimbals. The system is mounted on a base and frame 90 within which the gimbals are carried on the shock absorbers 91, so as to minimize vibration and shock to the apparatus.

Of the five gimbals shown 20, 30, 40, 50 and 60, the inner three round gimbals 20, 30 and 40 are the reference gimbals which were shown in FIG. 2. These are the gimbals which provide the physical directions of the various points involved in the guidance problem.

The outer two gimbals 50 and 60 (shown square) are the base motion isolation gimbals which keep the three reference gimbals fixed with respect to the earth regardless of pitch or roll of the vehicle. (Yaw of the vehicle is eliminated by means of the outermost reference gimbal 40, the azimuth gimbal, as will be explained below.)

It has been shown above how the integrating single-degree-of-freedom gyros used in the present invention react to a rotation in space about their input axes by a proportional rotation above their output axes, and how a signal generator is provided to give an output proportional to this output rotation. As was shown in FIG. 2, three such gyros are mounted on the controlled member (shown generally at 10) in the center of all five gimbals, and are so mounted that their input axes define a coordinate system. As the vehicle rotates in space, gimbal friction and inertia will tend to cause the controlled member 10 to be rotated with the vehicle. These three gyros then give three electrical outputs which represent the amount the controlled member has been moved in space from some initial position about three orthogonal axes on the controlled member.

As was explained above, these electrical outputs are used to actuate servo drives so that the controlled member is moved an amount equal and opposite to its displacement from its original position; in this way, the member is held fixed in space. For pitch and roll isolation the two outermost gimbals are moved, thereby moving the entire reference gimbal assembly. For roll, the roll gimbal 60 is moved; for pitch, the pitch gimbal 50. The servos which move these two gimbals are shown at 62, and 52, respectively.

In general, however, the three axes about which the gyros have measured the displacement are not the same as the axes of the two servos 62 and 52, and so the servos will move through an angle different from the displacement measured by the gyros. The gyros measure the angle of deflection with respect to the stabilized member; the servos move through an angle measured about their own axes. These two angles are related by the trigonometric functions of the angles between the gimbals which are between the controlled member 10 and the servos 62 and 52.

These trigonometric functions are obtained from resolver mounted on the intervening gimbals. A drawing and explanation of a resolver will be found in the above mentioned Patent No. 2,752,793. It suffices to say here that a resolver produces an output voltage or voltages related to its input voltage by the sine and/or cosine of the angle between its rotor and stator. For example, the resolver 43 is mounted on the pitch gimbal 50 and its outputs are proportional to the sine and cosine respectively of the angle between the pitch gimbal (its stator) and the azimuth gimbal 40 to which its rotor is connected.

Thus, the gyro output voltages are passed through the resolvers shown at 13, 23, 33, 43 and 53. When the gyro voltage has been thus modified it represents a deflection about the axis of the roll servo 62. The roll servo then moves the roll gimbal 60 until there is no more output voltage from the gyro. (It should be noted that no great accuracy is required from the resolution process, since the servo will keep acting until there is no more gyro output, and there will be output as long as any displacement exists. In other words, resolution affects only the speed with which base motion isolation takes place.) Similarly the pitch servo 52 moves the pitch gimbal 50 until there is no more gyro output to activate the servo.

The outermost reference gimbal 40, called the azimuth gimbal, isolates gimbals inside it from yaw motion of the vehicle, by exactly the same process as explained above for the roll and pitch gimbals. The reference function of the azimuth gimbal is to indicate the true vertical in the aircraft and it is oriented to the vertical by means of data from the range pendulum 40*r*, as was explained above, and it may therefore be freely moved about that vertical axis (45; see FIGS. 2 and 4) to isolate vehicle yaw, without in any way interfering with its reference function. The yaw servo 42 activates the yaw or azimuth gimbal 40, and the resolver 43 provides trigonometric functions for the angle between the yaw gimbal 40 and the pitch gimbal 50. The resolver 33 receives the relative rotation between the yaw gimbal and the range gimbal 30. It should be noted that the resolvers may be replaced by synchros or autosyns and the generation of trigonometric functions performed exterior to the gimbal configuration.

It will now be explained how the reference gimbals provide physical references to the directions involved in the guidance problem. It has been explained above how the isolation gimbals 50 and 60 and the azimuth gimbal 40, are continually moved by the isolation servos 52, 62 and 42, so as to keep the controlled member 10 fixed in space, isolated from motion of the vehicle, as detected by three rate-integrating gyros.

The axis 15 of the controlled member is initially set so it is parallel to the earth's polar axis 206. As shown in FIG. 2, the earth reference gimbal 20 is mounted on the controlled member axis 15 so it can rotate parallel to the earth's rotation in space. The earth reference gimbal is made to rotate about the controlled member at the sidereal rate, the earth's rate with respect to space, by a time drive 12 active between the controlled member 10 and the earth reference gimbal 20 (see FIG. 8, member 12). The time drive, pushing against the earth reference gimbal 20, cancels out the earth's rotation that would cause controlled member 10 to rotate in space. To an observer in the aircraft, the controlled member 10 will appear to rotate once a day. Actually, the member 10 is fixed in space by the gyro-servo loops and the earth reference gimbal, indeed the navigational system as a whole and the earth itself, rotate about the member 10.

The earth reference gimbal, rotating about the line 15 parallel to the polar axis of the earth 206, at a speed equal to the earth's rate, becomes a miniature earth. The axis 25 between the earth reference gimbal 20 and the range gimbal 30, is parallel to the equator 204 because it is perpendicular to the earth reference gimbal rotational axis 15 (parallel to the polar axis). When the system is being aligned, this axis is set parallel to the equatorial line 215. The axis 25 continues parallel to the line 215 as the earth rotates because gimbal 20 rotates at earth's rate.

The range gimbal 30 can rotate about this axis 25. In the initial setting it is rotated about this axis until the axis 35 between the range and azimuth gimbals is parallel to the normal 221 to the programmed great circle course 211 (plane 213). This parallel is set by rotating the range gimbal 30 about the axis 25 until the angle between the range-azimuth axis 35 and the controlled member axis 15 is equal to the angle between the polar axis of the earth 206 and the normal 221 to the great circle course.

It is usually convenient to have the device indicate when the vehicle has reached it destination. To accomplish this, a signal generating means 34 is provided between the azimuth and range gimbals, its zero position being set for the arrival point, that is, referring to FIG. 2, the angle between the destination vertical 219 and the equatorial line 215. When the angle between the azimuth and range gimbals reaches this value, the output is zero, and a relay or other suitable device may be actuated to indicate arrival. Preferably this signal generating means includes some device such as a synchro or autosyn for indicating with moderate accuracy the angle between the two gimbals over a wide range and a small-range precision signal generator like that described in the above-mentioned Patent No. 2,488,734 for indicating with high accuracy the angle near the zero or arrival point.

FIG. 12 is a block diagram showing the general relation of the servos, resolvers, gimbals and gyros. Heavy lines show mechanical connections, light lines show electrical connections. The system is mounted on a base 90, through which it senses the motion of the earth and vehicle. This motion is transmitted through the gimbals to the gyros 10*x*, 10*y* and 10*z* (see FIG. 8). The input axes of the gyros form a set of coordinates about which all motion is sensed. The gyro signals are amplified and passed through resolvers to transform the gyro coordinates to the servo axes (by trigonometric functions of the angles between the various gimbals).

The modified gyro outputs activate the outer, isolation servos 62, 52 and 42, moving the isolation gimbals 40, 50 and 60. Thus, the gyro-servo loop is closed, any motion of the member 10 away from its initial orientation in space being corrected by the isolation servos activated by the gyro detectors.

The positions of the reference gimbals with respect to the member 10 are set by the time drive 12 and the clamp 22. The vertical-detecting assembly, comprising the range pendulum 40*r* and its Schuler tuning, activate the servo 32 to orient the normal to the plane of the range gimbal 30 to the vertical. It can be seen from FIG. 12 how the time drive 12 and range drive 32 act as inputs to the gyros in the same way as vehicle motion and how they cause changes in the relative positions of the gimbals without disturbing the space position of the controlled member.

*The Four-Gimbal System*

FIG. 7 shows an alternative form of the present invention which eliminates one of the gimbals, thus saving both space and weight. Parts of the four-gimbal system which correspond to parts of the five-gimbal system are indicated with primed reference characters.

The eliminated gimbal is the azimuth gimbal 40 of FIGS. 2 and 6, which served two purposes: first, to isolate the other reference gimbals from yaw motion, and second, to indicate the true vertical as detected by the range pendulum which it carried.

The azimuth gimbal is replaced in its vertical-indicating function by an assembly 40′ having the platform 41 (FIG. 9). As shown generally in FIGS. 7 and 10 the assembly 40′ is mounted on the range gimbal 30′ in the same way that the azimuth gimbal 40 was mounted on the gimbal 30. The assembly 40′ includes the vertical-detecting pendulums 40r′ and 40n′, and their mounting platform 41, which is thus coupled to the range gimbal for rotation about its program axis.

The operation of the reference gimbals in the four-gimbal system can be seen in FIG. 10. FIG. 10 is the same as FIG. 2 except for the replacement of the azimuth gimbal 40 by the vertical-indicating assembly 40′. That is, the departure point vertical is shown at 217, the polar axis at 206, the arrival point vertical at 219, the great circle course at 211, the normal to the course at 221, the equatorial line at 215 and the equator at 204.

The gimbal configuration is essentially the same as that of FIG. 2. The controlled member 10′ with the three isolation gyros on it is in the center with its axis 15′ parallel to the polar axis 206. Surrounding it is the earth reference gimbal 20′ (rotated at the sidereal rate) and surrounding the earth reference gimbal 20′ is the range gimbal 30′. The axis 25′ between the earth reference and range gimbals is initially set parallel to the equatorial line 215. The angle between the range and earth reference gimbals is set at the colatitude of the normal to the great circle course 221 so that the axis 35′ is parallel to the direction 221.

The vertical-indicating assembly 40′ carries the two pendulum units and rotates about axis 35′ as did the azimuth gimbal 40 (FIG. 2). The normal to the platform in the member 40′ is the axis 45′ which is to be lined up with $V_r$ about the axis 35′ (see FIG. 5), and, for the configuration at the departure point shown in FIG. 10, the normal 45′ is made parallel to the departure point vertical 217. As the vehicle moves from departure point to arrival point, the axis 45′ will be aligned to successive verticals until the arrival point vertical 219 is reached.

It will be seen from FIG. 7, that because there is no longer an azimuth gimbal 40 to isolate from yaw motion of the base 90′, the outer isolation gimbals are rearranged to provide yaw isolation. The entire gimbal system is mounted on the base and frame 90′, rotatable about the yaw axis by the servo 82. Shock absorbers 91′ are provided along this axis. The outermost gimbal 80 acts as the yaw gimbal.

The next gimbal 70 is the roll or track gimbal, isolating the gimbals inside it from the major component of the roll motion and from the minor component of the pitch motion (in accordance with the angle between the track gimbal major axis and the craft axis) by resolver means and the servo 72. This gimbal is maintained with its major axis parallel to the direction of flight and its plane normal to the course plane, so the pendulum unit 40n′ is properly oriented. The third gimbal, the range gimbal 30′, acts to isolate the reference gimbal from the major component of the pitch motion and from the minor component of the roll motion by resolver means and the servo 52′. As was explained above with respect to the azimuth gimbal 40 in the five-gimbal system which also served a double, reference-isolation function, the range gimbal 30 itself and the reference system it contains (gimbals 20′ and member 10′) are isolated from all rotational base motion.

The controlled member 10′ is stabilized along axis 15′ parallel to the polar axis 206 as described above; the earth reference gimbal 20′ rotates around it at the sidereal rate by means of time drive 12′; the range gimbal 30′ is clamped by means of the clamp 22′ to the earth reference gimbal 20′ to establish an axis 35′ parallel to the normal to the great circle course (221 in FIG. 10).

The vertical indicating member 40′ is rotatable about this axis 35′, as was the azimuth gimbal 40, so that a point on the horizontal member 40′, as the member is rotated, sweeps out the great circle course 211. The member 40′ is driven with respect to the gimbal 30′. Both 40′ and 30′ are stabilized with respect to 70, by the servo drive 52′.

The member 40′ is shown in detail in FIG. 9. A platform 41 is mounted on a shaft extension 30a of the range gimbal 30′. The two pendulum units 40r′ and 40n′ are mounted on the platform which bears the same orientation as horizontal member 40a of FIG. 4. That is, the platform is rotatable about the axis 35′, parallel to 221. The track pendulum 40n′ indicates the direction of apparent vertical in the N plane normal to the great circle course 211 and its output is used to activate the autopilot to bring the vehicle back on course as explained above in the discussion of track control. The range pendulum 40r′ is used for determining $V_r$, the vertical in the course plane, and its integrated output is used to actuate the servo 32′ to maintain the platform 41 in a fixed relation to the vertical, so the plane of the platform is horizontal and the axis 45′ normal to the platform is vertical. Then the change of angle between the platform and the range gimbal is a measure of the range.

The servo 32′ serves the same function as the range drive 32 of FIG. 6 in that it rotates the vertical-indicating member (the azimuth gimbal 40 or the platform 41) with respect to the range gimbal (30 or 30′) in response to the integrated output of the range pendulum unit 40r′. In order to indicate arrival at the destination point, a signal generating means 34′ is provided to give a zero output when the angle between the normal 45′ to the platform 41 and the range gimbal 30′ corresponds to the angle between the arrival point vertical 219 and the equatorial line 215. This signal generating means preferably has high accuracy near the zero point, and a wide range (with moderate accuracy) as, for example, if a synchro and a signal generator are mounted together on the shaft 30a and the narrow-range signal generator used as the vehicle nears arrival and the wide-range synchro over the larger part of the trip.

*Constructional Features*

FIG. 8 shows in detail a controlled member 10 or 10′, suitable for use in either the four or five-gimbal systems. The member 10 is carried within the earth reference gimbal 20 on a rotatable shaft 21. The gimbal is initially set so that its axis 15 is parallel to the polar axis 206. Mounted rigidly on the shaft is a suitable bracket member 24 which supports the gyros 10x, 10y, 10z and time drive 12. It will be understood that the "controlled member," as used herein, refers to something that holds the gyros in proper orientations relative to one another. The bracket 24 may therefore be considered the controlled member, but the part 10 (or 10′) is shown in dot-and-dash lines in FIG. 10 to conform to the convention adopted in the other figures.

The gyro units 10x, 10y and 10z are each like the unit shown in FIG. 5. Their orientation may be seen by comparing their input axes $I_x$, $I_y$ and $I_z$ with the input axis I of FIG. 5. These input axes are preferably arranged so that they form orthogonal coordinates, and then motion is detected directly in right angle components by the gyros. The signal outputs of these gyros are passed by means of suitable electric connections (slip rings or flexible leads) to external components for amplification and resolution before being used to activate the isolation servos.

The time drive 12 is essentially a sidereal clock, crystal-controlled for accuracy, which causes relative rotation of the member 10 and gimbal 20, by driving against the gear 26 bolted on the gimbal 20.

The pendulum member shown generally at 14 is used to determine the latitude so as to correct the system for Coriolis effects. This operation is effected in the following manner. The Coriolis forces affect only the acceleration-detecting devices by introducing a "false" acceleration indicated by pendulum deflections. The important Coriolis term is twice the vehicle groundspeed times the angular velocity of the earth times the sine of the latitude; it acts transversely to the course, thereby affecting only the track control process. The first two quantities are measurable (and, since the term is only an additive correction, airspeed may be used as a sufficiently accurate measure of groundspeed). The term which must be obtained from the guidance system is the sine of the latitude, or, in this case, the cosine of the colatitude. The colatitude is the angle between the vertical at a point on the earth and the polar axis.

This angle is detected by the synchro-pendulum shown at 14. This unit consists of a frame 14*a* on which a synchro 14*b* is pivoted about an axis parallel to the axis 15. The rotor of the synchro carries a pendulous mass 14*c*. The synchro acts as a transmitter which causes another synchro (the receiver) to assume a rotor-stator position similar to that of the transmitter. From the receiver synchro a signal can be generated which is made proportional to the rotor-stator angle or to the sine or cosine of that angle. In operation, the transmitter synchro 14*b* itself pivots about its support pins until its longitudinal axis is horizontal; the pendulous mass 14*c* hangs to the vertical and the output of the transmitter-receiver is therefore a measure of the angle between the vertical and the axis 15, i.e., the colatitude. Using the sine of the latitude or cosine of the colatitude, the Coriolis term may be computed and subtracted from the output of the unit 40*n* or 40*n'*.

FIG. 13 is a block diagram of electrical connections for the purpose. The pendulum 40*n* responds to gravity and other accelerations in the cross-course plane, generating an output which is to be corrected for Coriolis effect. The correction sum is subtracted in a suitable mixing amplifier. A current generator produces a current scaled so it is of the proper magnitude to represent the earth's rotational velocity $W_e$ in the systems. This current is multiplied by the airspeed by means of a variable gain amplifier whose gain is made proportional to the airspeed $v_{as}$. This product is in turn passed through a resolver which multiplies its input by the sine of its rotor-to-stator angle. The rotor is positioned by the synchro receiver which is itself positioned by the synchro transmitter 14 on the member 10. The correction term, $W_e v_{as}$ sin Lat, is subtracted from the output of the pendulum 40*n*, by means of the mixing amplifier.

*Overall Operation*

In order to show further the operation of the present invention, FIG. 11 has been included to show the change in position of the gimbals as the aircraft flies a hypothetical course from the equator to the north pole. It will be shown first how the gimbals are initially aligned and second how they move in space and in the aircraft to record successive positions of the vehicle over the earth's surface.

FIG. 11 shows the earth 200 and an aircraft 1, which travels from a departure point 207 through an intermediate point 207*a* to a destination 209. The reference gimbals 20' and 30', the member 10' and the vertical-indicating member 40' for the four-gimbal system are shown. The azimuth gimbal 40 of the five-gimbal system has been included in dash lines for illustrative purposes.

The first reference to be set is that maintained by the azimuth gimbal axis 45 or the normal to the platform 45'. This axis is supposed to follow the vertical for successive positions of the airplane 1. Hence, initially, it should be set to the vertical at the departure point, axis 217. The angular position of the assembly about the axis 45 or 45' is not set until last.

The next reference to be set is to fix the initial angle between the plane of the range gimbal 30' and the vertical-indicating axis 45 or 45' of the member 40 or 40'. The axis 35' is to coincide with the polar axis 221 of the programmed great circle. Initially, then, the angle is the angle between the equator 204 and the departure point vertical 207 along the great circle 211. In the example of FIG. 11, the angle is zero. The clamping will be released after alignment and as the aircraft moves through its course, the vertical-indicating member 40 or 40' will follow the successive verticals, driven by the servo 32 or 32' (FIGS. 6 and 9).

The range gimbal 30' and vertical-indicating member 40 or 40' are now fixed with respect to each other. It remains to set the earth reference gimbal 20' with respect to the range gimbal 30'. The angle between their planes is the angle between the normal to the programmed great circle 221 and the earth's polar axis 206. The angle between them, then, should be the colatitude of the normal 221 to the programmed great circle. This angle is to be calculated and the gimbals clamped to that position throughout the flight. In the present example this angle is 90°.

At this stage, the gimbal assembly may be thought of as one rigid body free to rotate about the axis 45 or 45' as if it were hung on a string there. The setting remaining to be made is the proper angular position of the entire assembly about this axis so that the axis 35' will coincide with the normal to the programmed circle 221. This can be most easily done by rotating the assemblage about axis 45 until the axis of the controlled member 10' lies in a plane running north and south. Then, if all angles have been set in correctly, the controlled member axis will coincide with the earth's polar axis 206.

Initially in FIG. 11, the aircraft 1 carrying the guidance system is at a point 207 on the equator 204 and it is desired to fly a great circle course to the north pole at 209. Before the flight is to begin, the gimbals are set as described above and the gyros started. The two pendulum units are disconnected from their regular integrator systems and used directly to determine the vertical, their outputs being passed to an erecting movement. The integration may be dispensed with since there are no appreciable linear accelerations. That sets the member 40' to the horizontal (or the azimuth gimbal 40 to the vertical). The next step is to set the initial angle between the range gimbal 30' and the vertical-indicating member. Because this trip starts at the equator, this initial angle is zero. This angle is clamped in during the warm-up period and then released during flight to be fixed thereafter by the range servo 32 or 32'. The third step is to set in the angle between the range gimbal 30' and the earth reference gimbal 20', which is the co-latitude of the normal to the great circle course, in this case, 90°. This angle determines the course and is left clamped by means of the clamp 22 or 22' (see FIGS. 6 and 7) throughout the trip. The next setting to be made is to fix the axis of the controlled member in a north-south plane. This is done by using an optical sight on a star. The signal generator 34 or 34' (see FIGS. 6 and 9) is set so its null point fixes the target point vertical 219. Finally, the gyros and servos are started up so as to start the isolation system; then the aircraft may be moved about the field without disturbing the settings. A warm-up period allows the gyros to settle and any residual drift rates to be detected.

The angles of the various gimbals with respect to the airplane should be noted. The vertical-indicating axis 45 or 45' is straight up-and-down, the range gimbal axis 35' points east-and-west and the plane of the range gimbal is vertical. The member 40' is horizontal; the gimbal 40 is vertical. The axis of the controlled member 10' points north and is parallel to the earth's polar axis 206.

At 207*a*, the aircraft 1 is shown at an intermediate point on the great circle course 211. To an observer in the airplane the vertical indicating axis 45 or 45' still points up-and-down; the range gimbal 30' will appear to him to have rotated with respect to the vertical-indicating member about axis 35' an angle equal to the geocentric angle through which the aircraft has moved. There can be no motion of the earth reference gimbal 20' with respect to the range gimbal 30' because of the clamping. Hence, the earth reference gimbal will also appear to have rotated with respect to the vertical-indicating member 40 or 40'. Since this journey has taken time, the sidereal time drive will have rotated the earth reference gimbal 20' with respect to the stabilized member 10', an angle equal to the angle the earth rotated in that period. It will appear to an aircraft observer as if the stabilized member had rotated, as can be seen from the arrow on the member 10'. Just as an observer in the plane 1 will see the vertical gimbal 40 as unmoved, still straight up-and-down, he will also see the outer gimbals as aligned with the pitch and roll axes of the aircraft, substantially as gimbals 50 and 60 are in FIG. 6. Only the inner reference gimbals will seem to have moved because the observer has changed his position with respect to them and the earth they represent, but he has not changed his position with respect to his own airplane. All the motion in FIG. 11 can be accomplished by the servo 32 (FIG. 6) and the time drive 12.

FIG. 11 also shows the gimbal configuration at the end of the trip. The vertical-indicating axis 45 or 45', driven by the range servo 32 or 32', has rotated the full 90° of the journey, giving a continuous indication of the vertical and sweeping out the great circle course 211. The range gimbal 30' has remained fixed in geocentric space, its axis still parallel to the equator. The earth reference gimbal 20' has also remained fixed in geocentric space. The controlled member 10' has continued to rotate in geocentric space an amount fixed by the sidereal time drive. The arrival at the destination point 209 is signified by a null reading on the signal generator set between the range gimbal 30' and the vertical-indicating member 40 or 40' during the warm-up period, which indicates that the vertical-indicating axis 45 or 45' has reached the line of arrival vertical 219.

Although a course along a meridian has been chosen for simplicity of explanation, it will be clear that the system will maintain any programmed great circle course. The present invention differs from conventional navigating equipment, such as magnetic compasses or gyrocompasses. The system provides guidance along any chosen great circle course, and the guidance is unaffected by the relation of the chosen course to conventional earth coordinates. For example, gyrocompasses are insensitive in the neighborhood of the geographic poles, and magnetic compasses are similarly insensitive in the neighborhood of the magnetic poles. However, the operation of the present invention is not influenced by the poles, and courses may be laid through polar regions without introducing navigational difficulties.

Thus, the present invention is directed primarily toward the combination of a member stabilized in inertial space with gimbals so as to indicate a programmed course over the earth's surface and the position of a vehicle with respect to it. Such a guidance system is preferably made with the inertial space stabilization disclosed in the above-mentioned patent of Draper, Woodbury and Hutzenlaub, but the invention is not to be construed as limited to that construction. Furthermore it will be apparent to those skilled in the art that in some applications, certain gimbals may be unnecessary, so that the present invention includes not only the overall constructions shown in FIGS. 6 and 7 but its component parts as well.

Having thus described our invention, we claim:

1. A guidance system comprising an earth reference member, means for stabilizing the earth reference member with respect to the earth's polar axis, means for rotating the earth reference member with the earth about an axis parallel to the earth's polar axis, a range member adjustable with respect to the earth reference member about an axis perpendicular to the axis of rotation of the earth reference member, clamping means for setting the range member and the earth reference member at a fixed angle to determine any selected programmed great circle plane, the range member having a program axis normal to said great circle plane, a vertical indicating member carried by the range member, acceleration-detecting means carried by the vertical indicating member to detect horizontal components of acceleration in a plane to the programmed plane, driving means controlled by the acceleration detecting means to operate the vertical indicating member with respect to the program axis to maintain the vertical indicating member in a fixed relation to the vertical in the programmed plane, and means carried by the vertical-indicating member and sensitive to horizontal components of acceleration in a plane normal to the programmed plane to signal departures from the programmed plane.

2. A guidance system comprising a stable element stabilized in inertial space, an earth reference member rotatable with respect to the stable element about an axis parallel to the earth's polar axis, a time drive for the earth reference member to cause it to rotate about said axis at the earth's sidereal rate, a range member, said range member being adjustable with respect to the earth reference member about an axis perpendicular to the axis of rotation of the earth reference member, clamping means for setting the range member and the earth reference member at a fixed angle to determine any selected programmed great circle plane, the range member having a program axis normal to said great circle plane, a vertical indicating member carried by the range member, acceleration-detecting means carried by the vertical indicating member to detect horizontal components of acceleration in a plane parallel to the programmed plane, driving means controlled by the acceleration detecting means to operate the vertical indicating member with respect to the program axis to maintain the vertical indicating member in a fixed relation to the vertical in the programmed plane, and means carried by the vertical-indicating member and sensitive to horizontal components of acceleration in a plane normal to the programmed plane to signal departures from the programmed plane.

3. A guidance system comprising a stable element stabilized in inertial space, an earth reference member rotatable with respect to the stable element about an axis parallel to the earth's polar axis, a time drive for the earth reference member to cause it to rotate about said axis at the earth's sidereal rate, a range member adjustable with respect to the earth reference member about an axis perpendicular to the axis of rotation of the earth reference member, clamping means for setting the range member and the earth reference member at a fixed angle to determine any selected programmed great circle plane, the range member having a program axis normal to said great circle plane, a vertical indicating member rotatably mounted with respect to the program axis, acceleration-detecting means on the vertical indicating member to detect horizontal components of acceleration in two vertical mutually perpendicular planes, one of which is parallel to the programmed plane, driving means for the vertical-indicating member about the program axis, means for operating the driving means in response to horizontal components of acceleration detected in the plane parallel to the programmed plane, and means carried by the vertical indicating member and sensitive to horizontal components of acceleration in a plane normal to the programmed plane to signal departures from the programmed plane.

4. A guidance system for determining a path along a selected great circle comprising an earth-reference member, means for stabilizing the earth-reference member to the earth's polar axis, the earth reference member having an axis lying in the intersection of the equatorial plane and the plane of the selected great circle, a range gimbal for said earth reference member adjustable about said axis and having a program axis, means for setting the program axis normal to the plane of the selected great circle, acceleration-detectors to detect horizontal components of accelerations in the plane of the selected great circle and normal to the plane of the selected great circle, means rotatably coupled to said range gimbal about said program axis for carrying said acceleration detectors, driving means responsive to horizontal components of accelerations in the plane of the selected great circle to maintain said carrying means in a fixed relation to the local vertical, and means responsive to horizontal components of accelerations normal to the plane of the selected great circle to signal departures from said path.

References Cited in the file of this patent

UNITED STATES PATENTS

| | | |
|---|---|---|
| 1,501,886 | Abbot | July 15, 1924 |
| 1,997,893 | Wilkinson | Apr. 16, 1935 |
| 2,411,087 | Ford et al. | Nov. 12, 1946 |
| 2,414,291 | Evans | Jan. 14, 1947 |
| 2,532,402 | Herbold | Dec. 5, 1947 |
| 2,517,612 | Varian | Aug. 8, 1950 |
| 2,555,328 | Esval et al. | June 5, 1951 |
| 2,592,417 | Hale | Apr. 8, 1952 |
| 2,620,669 | Braddon | Dec. 9, 1952 |
| 2,762,123 | Schultz | Sept. 11, 1956 |

UNITED STATES PATENT OFFICE

CERTIFICATE OF CORRECTION

Patent No. 3,104,545 September 24, 1963

Charles S. Draper et al.

It is hereby certified that error appears in the above numbered patent requiring correction and that the said Letters Patent should read as corrected below.

Column 18, line 28, after "plane" insert -- parallel --; column 19, line 24, and column 20, lines 5 and 8, for "accelerations", each occurrence, read -- acceleration --.

Signed and sealed this 14th day of April 1964.

(SEAL)
Attest:
ERNEST W. SWIDER

Attesting Officer

EDWARD J. BRENNER

Commissioner of Patents